Patented Dec. 7, 1937

2,101,314

UNITED STATES PATENT OFFICE 2,101,314

PRODUCTION OF UNSATURATED HYDROCARBONS

Adolf Grün, Basel, Switzerland, assignor to American Hyalsol Corporation, Wilmington, Del., a corporation of Delaware No Drawing. Application March 14, 1935, Serial No. 11,072. In Germany March 17, 1934

3 Claims. (Cl. 260—170)

This invention relates principally to the production of high molecular weight unsaturated hydrocarbons. Such compounds have heretofore been prepared chiefly from higher aliphatic alcohols by separation of water.

An object of the present invention is to provide a simpler and commercially successful method of obtaining high molecular weight unsaturated hydrocarbons or alkenes not requiring already prepared high molecular alcohols.

A further object of considerable importance is to provide a source of intermediate products for the preparation of textile treating agents.

Other objects and benefits and uses of the invention will appear from the following description.

The principal reaction of the present invention comprises reacting substituted amines containing at least one alkyl radical of high molecular weight at elevated temperatures with compounds which form with such amines salts of either simple or complex nature or other complex compounds. The amines most suitable for use include those which besides containing the high molecular weight alkyl radical also possess an aliphatic, an aromatic, a cycloaliphatic or a heterocyclic radical which may be of a most varied nature.

The present invention in one of its more limited aspects extends to a method of producing the above mentioned alkyl amines. This process comprehends decomposing the substituted α-amino high molecular weight fatty acids such as α-anilino stearic acid and monomethyl anilino lauric acid into high molecular weight alkyl amines by heating the acids under conditions which avoid objectionable side reactions and decompositions whereby almost quantitative conversions are obtained as by heating in the presence of an inert solvent or diluent liquid which remains as a liquid at the temperature necessary for the decomposition.

The production of aliphatic unsaturated hydrocarbons from the higher molecular weight alkyl amines herein described may be accomplished generally by reacting the same with any one or more of a number of compounds which form salts with the amines, suitable compounds being phosphoric acid, phosphorous acid, silicic acid; complex acids such as zinc-hydrogen chloride; also, poly acids such as pyrophosphoric acid and polysilicic acids; also, hetero poly acids such as phosphotungstic acid; and salts such as the chlorides of zinc, cobalt, nickel and copper.

For carrying out the reaction with the above mentioned compounds stoichiometric proportions are preferably used. However, if unstable compounds are formed by the reaction with the amines which always regenerate again in the course of the reaction, considerably smaller proportions of the above compounds may be used. In bringing about the reaction the mixtures of the alkyl amine and the acid or salt or other compound are heated to a temperature sufficiently high to cause the reaction to proceed to completion. Temperatures of between about 200 to 280° C. are generally satisfactory.

Example 1

Thirty parts by weight of undecyl phenyl amine and 40 parts by weight of zinc chloride are heated in a still and the temperature gradually increased. At approximately 200° C. the zinc chloride readily dissolves. A moderate evolution of gas commences when the temperature is increased and at the same time pure undecylene distills off and is collected. Further increases in temperature to as high as 300° C. do not produce additional distillation.

Example 2

Three hundred and seventy-five parts by weight of α-anilino stearic acid are dissolved in ten times the amount by weight of paraffin oil during heating in which the temperature is slowly increased. When a temperature of approximately 140° C. is reached a considerable ebullition of gas commences. At a temperature of about 200 to 220° C. gas is evolved at a very rapid rate, but decreases as the temperature is increased. When a temperature of about 280° C. is reached no more gas is liberated. At the conclusion of the operation the paraffin solution and other impurities are removed from the heptadecyl phenyl amine. This compound is suitable for conversion into heptadecylene by the process herein disclosed.

In the above examples other secondary amines may be substituted, such for example, as pentadecyl phenyl amine, heptadecyl ethyl amine, diheptadecyl methylene phenyl amine and other like compounds.

It should be understood that the present invention is not limited to the specific examples of materials nor to the specific conditions of treatment herein disclosed. The scope of the invention is to be judged by the general tenor of the specification and the appended claims.

The invention is not limited to the treatment of monoamines, but may likewise be applied to diamines or even triamines.

Whereas, mononuclear aromatic amines are preferred in accordance with the present process, polynuclear aromatic amines may also be treated with satisfactory results.

As examples of cycloaliphatic amines there may be mentioned naphthenyl amine and cyclohexyl amine.

The higher molecular alkyl amines suitable for treatment in accordance with the present invention include particularly those having 11 to 20 carbon atoms.

I claim:

1. The process of splitting secondary amines containing at least one alkyl radical of more than 8 carbon atoms between the nitrogen atom and the carbon atom of said alkyl radical comprising heating such substituted amine together with a metal chloride capable of reacting with substituted amines forming salts to a temperature of about 200 to 280° C. at which the splitting occurs.

2. The process comprising reacting undecyl phenyl amine with zinc chloride at an elevated temperature at which undecylene forms.

3. The process of producing unsaturated hydrocarbons of high molecular weight comprising mixing a secondary amine containing an alkyl radical of more than 8 carbon atoms with zinc chloride, heating the mass to a temperature in excess of 200° C. until free unsaturated hydrocarbon distills off, and collecting said unsaturated hydrocarbon in a pure form.

ADOLF GRÜN.